Patented Dec. 28, 1937

2,103,757

UNITED STATES PATENT OFFICE 2,103,757

GATHERING OF SALT

John B. Semple, Sewickley, Pa.

No Drawing. Application June 29, 1937,
Serial No. 150,959

1 Claim. (Cl. 23—41)

This invention relates to the gathering of crystalline substances from surfaces upon which crystallization has occurred. It consists in a method of procedure; and it finds practical application in the gathering of salt from the surfaces of river beds in desert regions. The object is the recovery of the salt free or substantially free of the dross which, in the case cited, is the sand of the river bed.

Certain streams in arid regions of the western United States are choked with sand. The trough is filled with a bed of sand, and through this bed the water percolates. There is no depth of water over the surface of the bed of sand; to the contrary, it is only the deeper portion of the bed of sand that is completely saturated with the water of the stream. As the stream flows on into desert regions, evaporation becomes effective, carrying water from the surface of the sand; and as such tendency to dryness of surface comes about and persists, water is carried upward by capillary attraction from the deeper and more fully saturated portion of the bed of sand toward the surface. Such upward movement of the water and superficial evaporation are constantly in progress,—subject, of course, to diurnal and seasonal fluctuations of circumstance.

The water carries from its distant sources a burden of dissolved salt. This burden is of such slight magnitude that it is beyond ordinary detection and estimation; but, under the conditions that have been described, this salt becomes concentrated at the surface of evaporation, and crystallizes; so that, eventually (and the phenomenon is one of common and general observation) the sands of these river beds become heavily coated with a white deposit or incrustation of salt crystals.

The salt in and of itself is in substantially pure condition, and it is a valuable substance. It is the practice, therefore, to gather it, shoveling or scraping it from the surface, and carrying it away in suitable receptacles. Because, however, of the condition in which it is found, the operation of shoveling or scraping carries with the desired salt an inevitable adulteration of the sand upon which the salt has crystallized. Some further refining operation is necessary—as by solution, decantation, and recrystallization—to recover the salt, uncontaminated by sand.

My invention consists in spreading upon and in immediate contact with the surface of the sand of such a river bed a mat or covering of such water-absorbent material as burlap, canvas, felt, or the like. Such a mat will, so far as concerns the upward migration of the water, form one body with the sand. Capillary attraction will carry the water through the sand and through the mat, continuously; evaporation will occur on the surface of the mat; salt will crystallize and collect on the surface of the mat; the mat then will form a dividing screen or septum between the sand bed below and the salt incrustation above; and from the surface of the mat the salt may be gathered, by stripping or by pouring, or otherwise. The salt will be gathered, free of an adulterating content of sand; and, for many (if not all) commercial purposes, no further refinement is necessary.

The most obvious, and so far as I now know the only practical, application of the invention is in the gathering of the substance commonly called salt (NaCl) from these western river beds; but elsewhere there are other natural precipitates and incrustations of other particular minerals, brought about in like manner. And wherever such a natural process of crystalline accumulation is in progress, the method of gathering that I have described may be practised.

I claim as my invention:

The method herein described of gathering crystalline material free of dross from a native bed of evaporation and incrustation, supplied from beneath with a continuous solution of the material to be collected which consists in spreading upon and in contact with the surface of the bed a mat of water-penetrable material, allowing the heat of the sun to evaporate the solution, with the consequent effect of bringing about upon the surface of the mat an incrustation that is separated from the native bed by the intervening substance of the mat, and removing the incrustation from the surface of the mat.

JOHN B. SEMPLE.